(12) United States Patent
Smith-Casem et al.

(10) Patent No.: US 8,922,554 B2
(45) Date of Patent: Dec. 30, 2014

(54) THREE-DIMENSIONAL RECONSTRUCTION FOR IRREGULAR ULTRASOUND SAMPLING GRIDS

(75) Inventors: Mervin Smith-Casem, Renton, WA (US); Patric Ljung, Princeton, NJ (US); Guillaume Stordeur, Plainsboro, NJ (US); Jian-Hua Mo, Palo Alto, CA (US); Bruce McDermott, Bellevue, WA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 921 days.

(21) Appl. No.: 13/051,706

(22) Filed: Mar. 18, 2011

(65) Prior Publication Data
US 2012/0235998 A1    Sep. 20, 2012

(51) Int. Cl.
   *G06T 17/00*      (2006.01)
   *G01S 7/52*       (2006.01)
   *G01S 15/89*      (2006.01)

(52) U.S. Cl.
   CPC ......... *G01S 7/52034* (2013.01); *G01S 15/8993* (2013.01)
   USPC .......................................... 345/424; 345/419

(58) Field of Classification Search
   CPC .................................................. G01S 15/8993
   USPC .............................................. 345/419, 424
   See application file for complete search history.

(56) References Cited

U.S. PATENT DOCUMENTS

| | | | |
|---|---|---|---|
| 4,694,434 A | 9/1987 | von Ramm et al. | |
| 5,396,890 A | 3/1995 | Weng | |
| 6,511,426 B1 | 1/2003 | Hossack et al. | |
| 7,436,402 B2 | 10/2008 | Kwon et al. | |
| 7,678,056 B2 | 3/2010 | Wilser et al. | |
| 7,755,625 B2 | 7/2010 | Kwon et al. | |
| 2004/0138560 A1 | 7/2004 | Paladini | |
| 2005/0187474 A1 | 8/2005 | Kwon | |
| 2008/0125659 A1 | 5/2008 | Wilser | |
| 2008/0125661 A1 | 5/2008 | Garbini et al. | |
| 2009/0010459 A1 | 1/2009 | Garbini et al. | |

OTHER PUBLICATIONS

Tong, S. et al., *A Three-Dimensional Ultrasound Prostate Imaging System*, Ultrasound in Medicine and Biology, New York, NY, US, vol. 22, No. 6, Jan. 1, 1996, pp. 735-746, XP001152522.
Fenster, A. et al., *Three-Dimensional Ultrasound Imaging* Physics in Medicine and Biology, Taylor and Francis Ltd, London GB, vol. 46, No. 5, May 1, 2001, XP001205497.
EP Search Report and Opinion in counterpart EP Application No. 121459413.9, dated Jul. 17, 2012, 11 pages.
U.S. Appl. No. 12/554,749, filed Sep. 4, 2009.

*Primary Examiner* — Kee M Tung
*Assistant Examiner* — Peter Hoang

(57) ABSTRACT

An irregular ultrasound sampling grid is reconstructed to a three-dimensional grid for imaging. Volume data acquired with a helix transducer includes a fractional offset of data spaced along one dimension, resulting in the irregular ultrasound sampling grid. To determine a voxel value for a grid point on a uniform grid, two adjacent planes are identified. The sample locations in the two planes are not aligned, being on the irregular ultrasound sampling grid. Hardware acceleration devices, such as a graphics processing unit, perform bilinear interpolation in each of the planes. The data of each plane is interpolated to the proper global azimuth-range coordinate corresponding with the grid point. The bilinearly interpolated values from each plane are then linearly interpolated to the grid point.

8 Claims, 4 Drawing Sheets

US 8,922,554 B2

THREE-DIMENSIONAL RECONSTRUCTION FOR IRREGULAR ULTRASOUND SAMPLING GRIDS

BACKGROUND

This present invention relates to generating data for volume rendering or multi-planar reformatting (MPR). MPR and volume rendering are provided for medical images, such as diagnostic ultrasound images. To represent the volume, ultrasound data representing a plurality of spaced apart planes is acquired. Large datasets composed of tens or hundreds of images or frames of data are acquired. Each image or frame is composed of a grid of samples. The samples are spaced in an acquisition format (e.g., polar coordinate or cylindrical coordinate format) or in an imaging format (e.g., Cartesian coordinate). A stack or collection of such data represents a grid-like array in a volume.

The volume rendering or MPR may require resampling the volume data into a uniform Cartesian grid. This Cartesian grid uses a right-handed coordinate system in which the x-axis is along the azimuth dimension of the probe, the y-axis is along the elevation dimension of the probe, and the z-axis points away from the probe face at the center of the array. The range along scan lines may be different than the z-axis. The uniform grid is isotropic, such that the grid points are regularly spaced along each of three dimensions. The ultrasound data may be interpolated to represent the uniform Cartesian grid rather than the acquisition or imaging grids. Typically, the eight ultrasound samples nearest to a grid point are selected and trilinearly interpolated to form the voxel value for the grid point. Where the data of the different planes is aligned, the same x and z coordinates may be input for selecting data from different planes. However, ultrasound data acquired in an irregular pattern may result in memory calls to the wrong data. The reconstruction to the uniform Cartesian grid may not be correct.

U.S. Published Patent Application Nos. 2008/0125659, 20080125661, and 20090010459, and U.S. Pat. No. 7,678,056 disclose acquiring data for a volume with a helical array. By walking an aperture along the helical array, different planes are scanned. Due to the helical positioning of the apertures, different planes are not aligned in azimuth-range. Because of the irregular sampling grid, using hardware-accelerated trilinear interpolation may result in image artifacts in volume-rendered and multi-planar reformatted images. A standard trilinear interpolation kernel that fetches adjacent samples by incrementing the range, azimuth, and elevation addresses of an anchor sample by one unit may not select the proper azimuth addresses if the azimuth shift between slices is greater than one acoustic line width. Such problems may exist for other irregular sampling grids.

BRIEF SUMMARY

By way of introduction, the preferred embodiments described below include methods, computer readable media, and systems for three-dimensional reconstruction from an irregular ultrasound sampling grid. Volume data acquired with a transducer may include a fractional offset of data spaced along one dimension, resulting in the irregular ultrasound sampling grid. To determine a voxel value for a grid point on a uniform grid, two adjacent sampling planes are identified. The sample locations in the two planes are not aligned, being on the irregular ultrasound sampling grid. Hardware acceleration devices, such as a graphics processing unit, perform bilinear interpolation in each of the planes. The data of each plane is interpolated to the local (within the sampling plane) x-z coordinate corresponding with the grid point. The bilinearly interpolated values from each plane are then linearly interpolated to the grid point.

In a first aspect, a method is provided for three-dimensional reconstruction from an irregular ultrasound sampling grid. Ultrasound data representing sample locations in first and second planes associated with scanning from different apertures along a linear array twisted about a longitudinal axis of the linear array is acquired. The sample locations of the first plane are offset from the sample locations of the second plane by a non-integer amount. A grid voxel of a three-dimensional grid is determined. The grid voxel is between the first and second planes. A graphics processing unit bilinearly interpolates a first sample in the first plane from data of the sample locations of the first plane and a second sample in the second plane from data of the sample locations of the second plane. A voxel value for the grid voxel is linearly interpolated from the first and second samples. An image, such as volume rendering image or MPR, is rendered from the three-dimensional grid. The image is a function of the voxel value.

In a second aspect, a system is provided for three-dimensional reconstruction from an irregular ultrasound sampling grid. A memory is configured to store ultrasound data representing sample locations in first and second planes. The first and second planes are spaced apart in a first dimension. The sample locations make up the irregular ultrasound sample grid such that the sample locations of the first plane are offset from the sample locations of the second plane by a fractional distance along a second dimension different than the first dimension. A fragment processor of a graphics processing unit is configured to linearly interpolate to a Cartesian grid from bilinearly interpolated samples of the first and second planes.

In a third aspect, a non-transitory computer readable storage medium has stored therein data representing instructions executable by a programmed processor for hardware accelerated three-dimensional reconstruction. The storage medium includes instructions for acquiring a plurality of range-azimuth slices of ultrasound data. The ultrasound data of the range-azimuth slices represents locations spaced in a two-dimensional ultrasound scan format. The range-azimuth slices are non-aligned along elevation. The storage medium includes instructions for bilinearly interpolating to first and second positions in first and second ones of the range-azimuth slices from the ultrasound data of the first and second range-azimuth slices, and linear interpolating from the first and second positions.

In a fourth aspect, a method is provided for three-dimensional reconstruction from an irregular ultrasound sampling grid. A point in Cartesian space is identified. Two acquired ultrasound scan planes closest to the point are found. The finding is from a volume of ultrasound scan planes having samples in a scan format. Data at locations on the two acquired ultrasound scan planes are interpolated with hardware acceleration. The locations have a same coordinates in two dimensions as the point. A value for the point is interpolated from the data at the locations.

The present invention is defined by the following claims, and nothing in this section should be taken as a limitation on those claims. Further aspects and advantages of the invention are discussed below in conjunction with the preferred embodiments.

BRIEF DESCRIPTION OF THE DRAWINGS

The components and the figures are not necessarily to scale, emphasis instead being placed upon illustrating the FIG. 1 is a flow chart diagram of one embodiment of a method for three-dimensional reconstruction from an irregular ultrasound sampling grid;

FIG. 5 shows the associated interpolation weights;

DETAILED DESCRIPTION OF THE DRAWINGS AND PRESENTLY PREFERRED EMBODIMENTS

A reconstruction method is provided for real-time three-dimensional imaging with a helical array ultrasound transducer or other array resulting in an irregular sampling grid. For the helical array, there is a regular spacing of samples within range-azimuth slices. In elevation, the slices are not aligned, such as being azimuthally displaced by one or more line widths and a fractional amount. Using hardware-accelerated trilinear interpolation on this irregular grid may result in image artifacts in volume-rendered and multi-planar reformatted images.

It is desirable to exploit as much hardware-acceleration during volume rendering and multi-planar reformatting as possible. A hardware-accelerated reconstruction method for scan geometries with irregular sampling grids may provide real-time rates for volume rendering and/or multi-planar reformatting. The trilinear interpolation operation of the three-dimensional reconstruction is divided into hardware-accelerated bilinear interpolation at the closest two adjacent acquired slices and then linear interpolation of the bilinear interpolation results or between the slices.

The bilinear interpolation in the planes followed by linear interpolation of the results to a grid point may avoid inaccurate data selection using a trilinear interpolation kernel. The bilinear-linear sequence may also provide real-time reconstruction to support high volume rates, such as up to thirty volumes per second in echocardiography.

Figure 1:
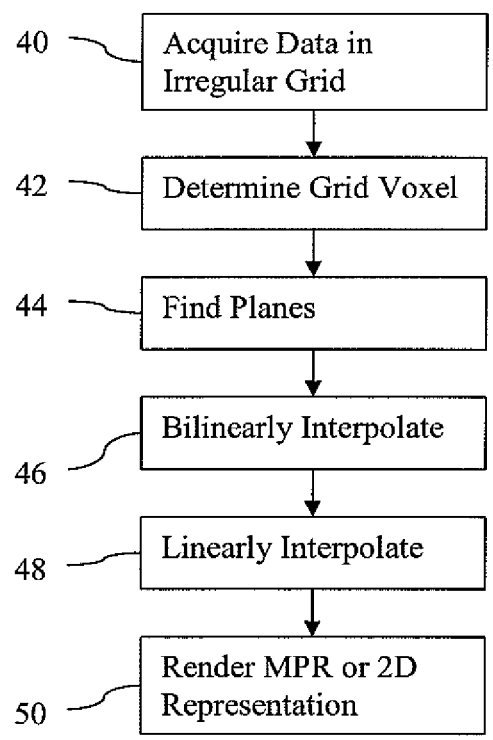

FIG. 1 shows a method for three-dimensional reconstruction from an irregular ultrasound sampling grid. The reconstruction generates data for volume rendering or multi-planar reformatting. The reconstruction data is generated from two dimensional textures (e.g., images) or three-dimensional textures (e.g., volume data). The method is implemented using the system 10 of FIG. 7 or a different system. The same or different order of acts 40-50 may be used. Additional, different or fewer acts may be used. For example, acts 40-48 are performed without act 50. As another example, act 44 corresponds to identifying an area or sample locations regardless of plane positions.

In act 40, ultrasound data representing sample locations is acquired. The data is acquired by loading from memory, by transfer, or by scanning. The ultrasound data is B-mode, color mode, harmonic mode, contrast agent mode, combinations thereof, or other types of ultrasound data. Frames of data prior to display, frames of data for display, or displayed images may be used.

Each frame of data or image represents a two-dimensional area. The two-dimensional ultrasound data may be considered a texture for rendering. The data is a two-dimensional array of data points. Multiple such frames or images are acquired for representing a volume.

The ultrasound data represents an irregular ultrasound sampling grid. The ultrasound data is originally acquired by scanning a patient. Echoes from within the patient are received. Using beamformation or other technique, the scanning region is sampled. The scanning region may be a two-dimensional plane. The distribution or format of the samples within the two-dimensional scan region may be Vector®, sector, linear or other scan format. For example, the data is in a polar coordinate format. As another example, the data is scan converted data representing Cartesian coordinates. Any regular or irregular spacing may be used for the sample locations represented by the data. Regular spacing is consistent, uniform, and/or pursuant to a same format throughout the area or volume. In the area, the sample locations are spaced according to the two-dimensional ultrasound scan format.

Figure 2:
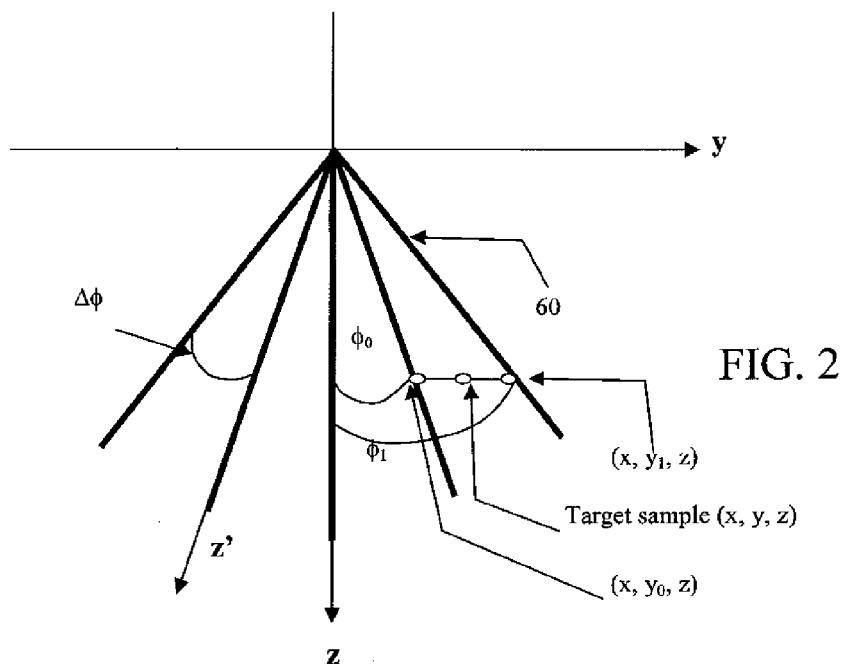
FIG. 2 is an example illustration viewing a stack of planes along the azimuth dimension.

For volume scanning, the data represents different planes in a volume. FIG. 2 shows a plurality of two dimensional images or planes 60 representing a volume. The data of the two-dimensional planes 60 are textures in a three-dimensional volume array of data assembled from a regular or irregular succession of adjacent planes 60 through the body or patient being scanned. For example, FIG. 2 shows the planes 60 in a fan distribution with a regular $\Delta\Phi$ angular separation between each plane 60 over a $-\Phi$ or $+\Phi$ range. Non-uniform spacing of the planes 60 may be used. Parallel planes 60 may be used.

In one embodiment, each of the planes 60 is generally in range, along z, and azimuth, along x, with the planes spaced apart in elevation, along y. Azimuth, elevation, range are different coordinates from x, y, z coordinates. x/y/z are Cartesian coordinates, and azimuth/elevation/range are acquisition/acoustic coordinates. "Along" is used to show that x/y/z are related to azimuth/elevation/range, such as being similar or the same. The x, y, z coordinates are a global Cartesian coordinate arrangement. FIG. 2 shows the planes 60 viewed along the x or azimuth axis. If the volume is viewed along the x-axis or dimension, the two-dimensional planes 60 appear substantially as lines. Where the scanned region curves, the planes 60 may be warped and not appear as lines. Range-azimuth slices refer to planes in the acquisition/acoustic coordinate reference even though the planes are acquired in a polar, cylindrical or other format and even though the slices may not be parallel along the elevation axis. The planes may have an elevation variation as well, such as shown in FIG. 2. The planes 60 fan from a same origin, but are range-azimuth slices. Other arrangements may be used.

For each plane, the two-dimensional scan format is used. Each plane represents sample locations in range-azimuth slices. Each plane has the same two-dimensional scan format for the ultrasound data (regular sampling in azimuth-range), but different planes (e.g., frames of data) may have different formats. The data of the planes 60 may have a same or different scaling. For example, some frames of data are acquired with a lesser resolution, such as for planes at the extremities of the volume. Other ultrasound data is acquired with a higher resolution, such as for planes 60 intersecting a region of interest in the volume.

In an embodiment represented by FIG. 2, the planes 60 are associated with scanning from different apertures along a linear array twisted about a longitudinal axis of the linear array. For example, a helix twisted array in a catheter is used to scan the patient. U.S. Published Patent Application Nos. 20080125659, 20080125661, and 20090010459, and U.S. Pat. No. 7,678,056, the disclosures of which are incorporated herein by reference, disclose acquiring data for a volume with a helical array. The 3D helix geometry extends the 2D Vector®, sector, or other geometry by sweeping each 2D plane 60 in the elevation dimension and translating each slice along the azimuth dimension.

Referring to FIG. 1 of U.S. Published Application No. 20080125659, some of the elements of the array are rotated. The rotation is about the azimuth axis. The rotation forms a helical or spiral pattern of the elements. The adjacent elements are arranged in a helix along the azimuth axis. The angle of greatest sensitivity is different for the rotated element as compared to another element. The elements at opposite ends of the array are rotated about the azimuth axis by at least 10, at least 15 or other greater or lesser number of degrees relative to each other. The azimuth centerline is straight or may rotate or twist. Greater or lesser total rotation may be used. Each of the elements in between is rotated to step the rotation between the ends.

In general, a larger aperture in elevation provides increased elevation directivity and narrower elevation beamwidth. By twisting the array in elevation, a sub-aperture of elements is used to form an image plane 60. The total number of independent beams that can be formed by an array is on the order of the number of elements of an aperture. By varying the total twist relative to the elements angular beamwidth, there is a tradeoff between resolution in azimuth and the elevation angular width of the volume formed.

Figure 4:
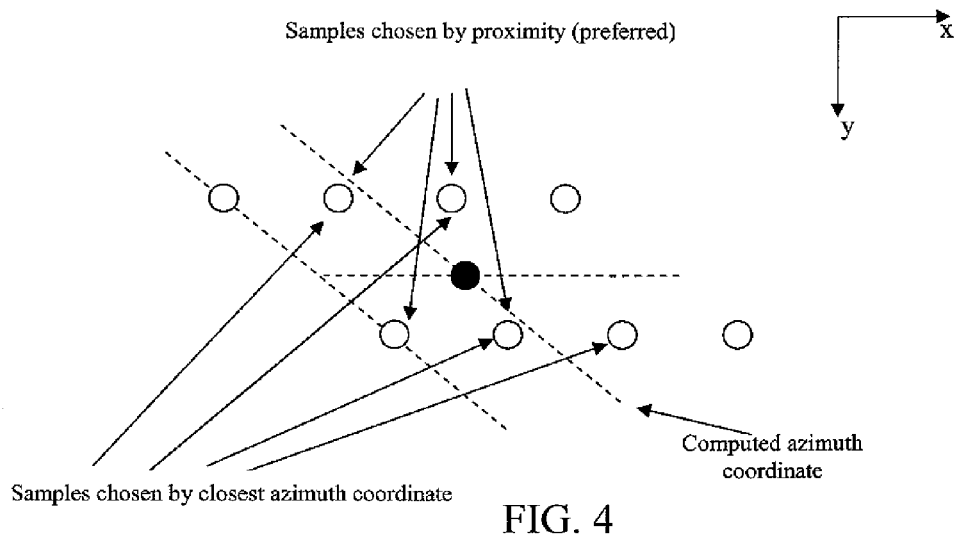
FIG. 4 is a graphical example of misalignment and resulting trilinear interpolation error.
Figure 5:
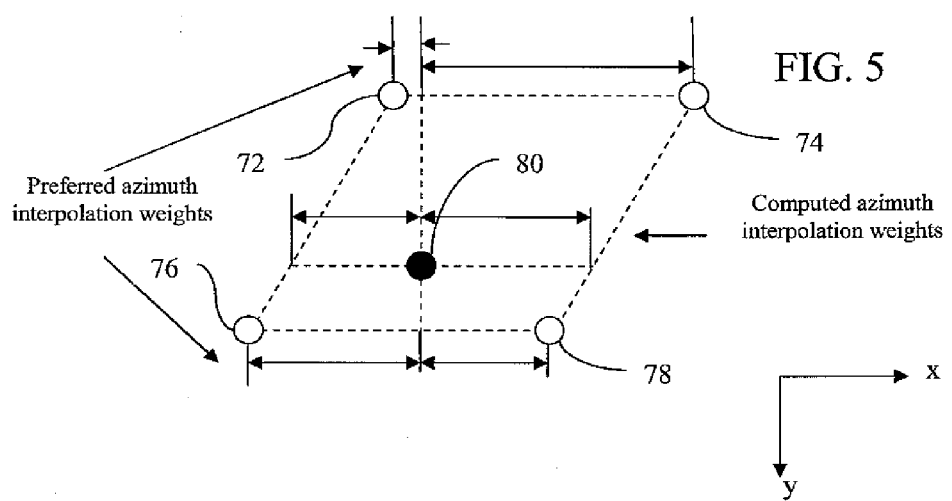
FIGS. 5 and 6 are graphical examples of sequential bilinear and linear interpolation.

Referring to FIGS. 4 and 5 of U.S. Published Application No. 20080125659, an aperture is formed on the array of elements. The aperture is formed by connection of conductors and associated elements to a beamformer. The elements used for transmitting and/or receiving during a given transmit and receive event define the aperture.

A plane is scanned with the aperture. Using electronic focus, transmit and receive beams are formed using the elements of the aperture. By changing the focus, a planar region may be scanned sequentially using the aperture. The scanned plane may include a twist or distortion in spatial position due to the twist of the elements within the aperture. In response to the transmission and reception with the aperture, data representing the scanned region is acquired. The rotation of the elements results in the acquired data representing the region at a particular elevation rotation.

Other apertures are formed for scanning other planes. For each of the apertures, a corresponding generally planar scan region is scanned. The scan regions are offset from each other in the elevation dimension and are associated with different amounts of rotation about the azimuth axis. The planes are adjacent to each other along a dimension substantially orthogonal to the planes (e.g., the elevation dimension). The longitudinal (azimuth) and depth (range) extent of each scan region is similar, overlapping, or different. The elevation angle of each plane is different, such as diverging from a common axis that is also the axis of rotation of the array.

By selecting a different aperture, a different plane is scanned. The position of the plane corresponds to a different angle of twist associated with the elements than for other apertures. Other apertures may be formed for scanning other regions or planes. The planes are spaced apart, but overlap in azimuth and range.

Figure 3:
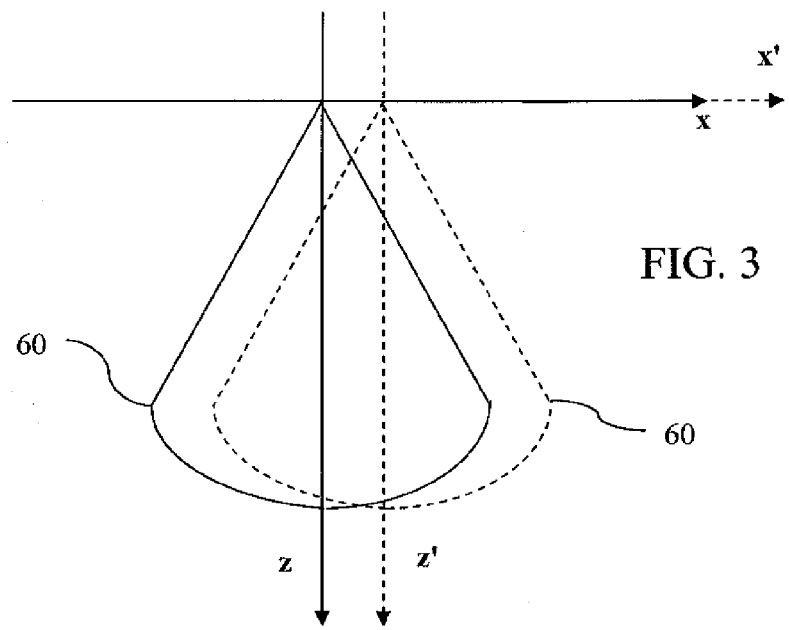
FIG. 3 is an illustration viewing two of the planes of the stack of FIG. 2 along an elevation dimension.

As a result of the walking aperture, the data of different planes is offset. FIG. 3 shows two adjacent planes with data in a sector format. The view is along the elevation axis. The range-azimuth slices are not aligned along elevation, but are instead offset. For example, referring to an x, z location in one range-azimuth slice does not refer to a location of data in another range-azimuth slice given that x, z are Cartesian or global coordinates. The azimuth and range locations of each slice represent different positions relative to the volume.

Due to the physical arrangement of the apertures, the offset may be by a non-integer amount. The sample location in one plane 60 may be shifted in azimuth by a fractional amount in an adjacent plane, such as a fractional amount greater than one scan line (e.g., 1.33 receive scan line shift). The slices are not aligned along elevation. Because of the azimuth translation of each slice, 8-sample kernels (e.g., trilinear interpolation or filtering kernels) are not symmetric about all three Cartesian axes. In particular, the four samples making up the x-y planes in each kernel form the shape of a parallelogram. FIG. 5 shows two samples 72, 74 in one plane relative to two samples 76, 78 in another plane. The planes and samples are shifted a fractional amount relative to each other and may be shifted by a greater amount relative to local x, z locations (see FIG. 6).

Referring to FIGS. 2 and 3, the relationship of the global Cartesian coordinate system to the acquisition format is shown. In the coordinate transformation computations to and from the Cartesian coordinate system, $h_t$ is the elevation twist rate measured in rad/mm. This defines the slice rotation as a function of azimuth distance from the origin. The slice rotation is around the azimuth, x, axis and along the elevation, y, axis. The origin is a starting position or other arbitrary position. $\Phi$ is the elevation angle. Each slice has its own or local xz coordinate system whose origin is at the center of the respective aperture. The z-axis in each local coordinate system is referred to as "z-prime" or z' since the local z-axis differs from the global z-axis shown in FIG. 2. The z-prime axis is a rotated version of the z-axis. The x-axis lies along the axis of rotation, and the elevation angle is the rotation angle. The x-axis in each local coordinate system is referred to as "x-prime" or x' since the local x-axis differs from the global x-axis as shown in FIG. 3. The x'-axis is a translated version of the x-axis. The x'-axis is translated along the x-axis by an amount proportional to the elevation twist rate and the elevation angle.

To reconstruct the acquired data for imaging, the data is interpolated to a three-dimensional grid. The three-dimensional grid is in the global Cartesian coordinate system. By reconstruction, the data obtained from the scan is formatted for imaging. For example, the data is interpolated to a three-dimensional evenly spaced grid. As another example, the data is interpolated to a plurality of arbitrary or non-scan planes for MPR. The known plane positions, sample depth, and scan line position provide relative spatial position information for each datum.

The locations from the three-dimensional grid to be used in imaging are identified in act 42. All of the locations in the three-dimensional grid are populated or only selected locations are populated. Each location is a voxel. The voxel represents a volume element of an array of such elements in the grid. Each voxel is isotropic or has equal dimensions. Non-isotropic voxels may be used. The three-dimensional grid is isotropic. The grid points or voxels are regularly spaced, such as having equal spacing along all three dimensions. Non-isotropic grids may be used.

To populate a grid voxel of the three-dimensional grid, the grid voxel is identified in act 42. The point in Cartesian space to be used for rendering or other imaging is determined. The point is determined as part of sequentially populating all of the grid points or is specifically determined as needed for selected imaging. The type of imaging, any clipping, or other parameters for imaging indicate the points or voxels to be used. For example, the entire volume is to be used for three-dimensional volume rendering. Each point in the grid is identified. As another example, clipping or obstructions for volume rendering designates a sub-set of the voxels to be used for rendering. Only the voxels to be used are identified. In another example, only the points along MPR planes are selected for interpolation.

FIG. 2 shows a selected voxel as the target sample. The target sample is between two planes 60. The target sample has x, y, z Cartesian coordinates.

Referring to FIG. 1, the planes 60 to be used for interpolation are found in act 44. The planes 60 closest to the voxel are identified. The known locations of the planes 60 within the volume, as defined by the Cartesian coordinate system, are used to find the two planes closest to the target sample. For a given point (x, y, z) in Cartesian space, the closest two adjacent acquired slices are found.

Figure 6:
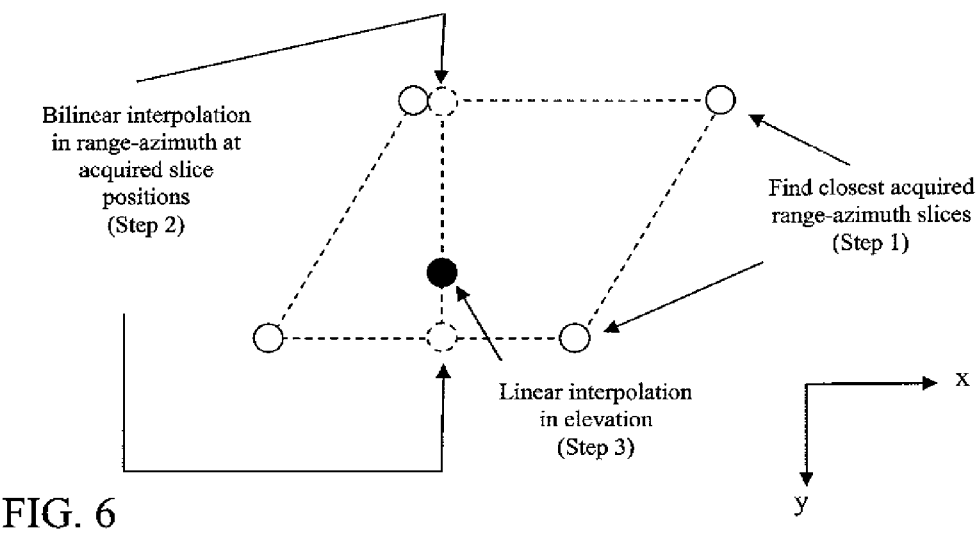

FIG. 6 represents finding the planes, such as the planes corresponding to the locations 72-78 of FIG. 5. The dark dot is the target sample location, shown in FIG. 2. The spacing of slices in elevation (($\phi_{span}$ is the total elevation span and $N_{elev}$ is the number of acquired elevation slices) is computed. $\Delta\phi=\phi_{span}/(N_{elev}-1)$ provides the spacing for regularly or evenly spaced slices in the fan acquisition. For each Cartesian coordinate triplet (x, y, z), the elevation angle is computed as: $\phi=\arctan(y, z)$. This provides the elevation angle for the target sample location. The nearest acquired elevation angles before and after $\Phi$ are found where $\Phi_{min}$ is the elevation minimum angle: $\phi_o=\phi_{min}+\Delta\phi*\text{floor}((\phi-\phi_{min})/\Delta\phi)$ and $\phi_1=\phi_o+\Delta\phi$. The planes 60 represented as $\phi_o$ and $\phi_1$ are the identified planes.

The y coordinate associated with these two planes is computed. The y coordinates on the acquired slices at $\phi_o$ and $\phi_1$ for the same z and x coordinates are given as: $y_0=z*\tan(\phi_o)$ and $y_1=z*\tan(\phi_1)$.

In act 46, the bilinear interpolation is performed for each of the identified planes 60. The ultrasound data for each of the range-azimuth slices is interpolated to positions on the slices corresponding to the x, z position of the target sample. The positions in each plane to which data is to be interpolated are a same x and z location in the volume. The x and z locations are the same as the grid point. Points are interpolated on each of the identified slices and to the same x and z coordinates as the desired point. For example, FIG. 6 shows two samples on each plane. The two samples on each plane are interpolated to the x position (middle sample) on each plane. This provides linear interpolation. For bilinear interpolation, the x, z location on each plane is between four samples. The four samples are interpolated to the global x, z location.

In interpolation, data at the desired sample locations is loaded from memory. Using sequential memory addressing may cause problems in trilinear interpolation. FIG. 4 illustrates the difference between choosing the interpolation kernel based on the closest azimuth coordinates (standard approach) and choosing the interpolation kernel based on proximity (preferred approach) for azimuth translations of greater than one acoustic line width. An azimuth line is shown through the target sample (black dot). Following the azimuth line, the two samples in each plane on each side of the line are chosen. If the computed azimuth address is used to find the closest samples by finding the anchor sample and incrementing the azimuth address by one on each slice, the samples that are chosen are not actually the closest acquired samples to the target sample location.

For the bilinear interpolation, the interpolation weights are determined based on the relative locations. The relative distance from each sample location of ultrasound data in a given plane to the x, z coordinate of the target sample reflected on the plane is used as the interpolation weight.

Because of the azimuth translation of each slice, the fractional part of the azimuth coordinate computed during the resampling operation cannot be used as an interpolation weight. In a simplification shown as a linear interpolation, FIG. 5 shows the relative weighting. For a given x-coordinate, the fractional parts of the azimuth addresses for the closest two acquired slices are different. The horizontal arrows between the x axis locations at the target sample represent differences that are not appropriate for the data in the planes at the actual samples 72-78. The arrows along the x-axis of or in each plane show the distances between the samples on the plane and the target sample in the x-axis. The x interpolation weight in each plane is computed as: $h_x=(x-x_0)/(x_1-x_0)$. The weights for each plane are different due to the offset.

For bilinear interpolation, the weights in the z axis are calculated in the same way. Where the irregular grid is not offset in range, the weights for both slices are the same. The bilinear interpolation weights may be calculated in the plane rather than separately along x and z axes. Four weights are calculated for the bilinear interpolation. The four weights are based on the relative distances in the plane to the target location projected on the plane. The four nearest sample locations in each plane are used to determine the weights for bilinear interpolation on the respective plane.

The ultrasound data in each plane to be interpolated is identified. The range and azimuth values for the slice at $\phi_o$ are computed. $h_t$ is the elevation twist rate in rad/mm. $x_{apex}$ is the vector apex for the azimuth dimension. The vector apex is zero for a sector scan where the origin is at the face of the transducer. The vector apex may be positioned behind the face, providing for a negative vector apex value in mm $T_{c->a}(.)$ is the coordinate transformation from Cartesian to acoustic coordinates for 2D vector equal angle/sine spacing to range and azimuth coordinates $r_0$ and $a_0$, respectively. $r_0$ is the range away from the transducer in the scan plane or local coordinates, and $a_0$ is the position along the transducer (azimuth) in the scan plane or local coordinates.

To find the local coordinates or $r_0$ and $a_0$ coordinates corresponding to the x, z coordinates of the target sample, the following is performed:

$$x_{shift}=\phi_o/h_t$$

$$z'=z/\cos(|\phi_o|)$$

$$x'=x+x_{shift}$$

$$[r_o,a_0]=T_{c->a}(z',x',x_{apex})$$

Likewise, $r_1$ and $a_1$ are computed for the other plane, $\phi_1$.

The ultrasound data for the computed locations is retrieved from the corresponding memory locations for the data. The addresses for the slices at $\phi_{\hat{o}}$ and $\phi_1$ are computed using a function A(.). Function A(.) calculates the memory address for a given elevation angle. Function A(.) accounts for the reverse order of slices stored in memory or other storage order. $e_0=A(\phi_{\hat{o}}$ and $e_1=A(\phi_1)$ are the memory locations for the samples.

Once the ultrasound samples are loaded, the bilinear interpolation is performed. Bilinear interpolation is performed on the slice at $\phi_{\hat{o}}$ in volume V to obtain a scalar value $p_0$ representing the interpolated value with the same z and x coordinates as the target sample on the acquired slice at $\phi_o$. The bilinear interpolation is also performed on the acquired slice $\phi_i$. For example, function B(.) performs a bilinear interpolation on a given slice at given range and azimuth coordinates: $p_0=B(V[e_0], r_0, a_0)$ and $p_1=B(V[e_1], r_1, a_1)$. The four closest or surrounding ultrasound samples in each plane are interpolated to the x, z Cartesian coordinate in the plane using the interpolation weights. In alternative embodiments, the two closest azimuth and/or range samples are interpolated. Three or other numbers of samples may be interpolated.

The bilinear interpolation is performed by a processor. In one embodiment, a graphics processing unit performs the interpolation. Other hardware acceleration may be used, such as by digital signal processors, applications specific integrated circuits or other circuits for performing interpolation in parallel operations. Custom, standard, or off the shelf hardware acceleration may be used. Exploiting hardware-accelerated bilinear interpolation may allow more rapid rendering or real-time operation. If bandwidth is available, the hardware-acceleration may also be used for the linear interpolation in act 48. Because the bilinear interpolations in two planes involve eight sample retrievals from volume memory as well as the computations associated with those eight samples, the hardware acceleration bandwidth is applied to the bilinear interpolation rather than the linear interpolation where bandwidth is not available for both.

In act 48, the ultrasound data interpolated to the x, z position in the two planes is linearly interpolated. The results of the bilinear interpolations are interpolated to the grid point. The voxel value results from the linear interpolation. The value from each plane at the x, z position is interpolated to determine a value at the target sample or grid point in the reconstruction between the two planes. The resulting value is the voxel value for the reconstruction. The value represents the target sample for the three-dimensional grid point.

In FIGS. 5 and 6, the vertical (elevation) dashed line represents the linear interpolation. The target sample is shown as the dark dot, and the two circles along the vertical dashed line on each side (above and below as viewed in FIGS. 5 and 6) of the target sample are the bilinearly interpolated data. The linear interpolation is of the two circles to the dark dot. The value for an elevation location in the volume and between the range-azimuth slices is interpolated.

The interpolation weights are determined by the relative distances of each circle to the dark dot. The linear interpolation of $p_0$ and $p_1$ uses interpolation weight $h_y$: $p=p_0*(1-h_y)+p_1*h_y$.

The interpolation is performed by the graphics processing unit. The graphics processing unit calculates the weights and performs the linear interpolation. In alternative embodiments, another processor determines the weights or a look-up table is used for the weights. Another processor may be used for the interpolation, such as a general or control processor.

The ultrasound data is reconstructed along the three-dimensional grid. Acts 46 and 48 are repeated for other voxels between the two planes. The repetition may be based on identifying reconstruction grid locations between each pair of slices. Values for a plurality of grid voxels between any pair of frames are determined. The repetition continues for other pairs of planes.

Alternatively, the repetition is by identifying a next grid location. The slices are found in act 44 and the interpolations of act 46 and 48 are repeated for each grid location. Voxel values for the isotropic Cartesian grid are determined by the repetition.

In act 50, an image is rendered from the voxel values of the three-dimensional grid. The rendering is performed by the graphics processing unit, the general processor, other processor, or combinations thereof. The image may be rendered at least ten times a second. Using hardware acceleration, greater rates of rendering may be provided, such as 25, 30 or more images per second. A series of images based on different sets of scan or ultrasound data is generated in real time with the acquisition by scanning of the data. Alternatively, the ultrasound data is acquired from memory and not connected to the scan rate (e.g., may be rendered at a slower rate).

The image is a function of one or more voxel values. The image is rendered as a two-dimensional representation of a volume or the image is rendered as a multiplanar reformatted image. The image is rendered from the reconstructed data or voxel values. At least one of the voxel values resulting from the linear interpolation is used for imaging.

In one embodiment, the reconstruction data representing the three-dimensional grid is used to render a two-dimensional representation of the volume. The rendering is for any viewing direction. For viewing direction oriented rendering, the data along viewing directions or lines is combined. Any rendering technique may be used, such as indirect or direct volume rendering techniques. For example, a maximum, minimum, average or other intensity projection rendering is performed. Color and/or opacity values may be interpolated for rendering along the desired direction. While indirect methods generate and render an intermediate representation of the volume data, direct methods display the voxel data by evaluating an optical model which describes how the volume emits, reflects, scatters, absorbs and occludes light. The voxel values are mapped to physical quantities which describe light interaction at the respective points in 3D-space. During image synthesis, the light propagation is computed by integrating light interaction effects along viewing rays based on the optical model.

Texture-based volume rendering approaches include view-aligned or object-aligned methods depending on the orientation of the proxy geometry. For view-aligned slicing, the proxy geometry is oriented orthogonal to the viewing direction of a virtual camera. The volume data is represented by a block of voxel data (3D texture). For object-aligned slicing, the proxy geometry is oriented orthogonal to the three main axes of the volume. A large number of view- or object aligned slices through the volume of voxel data are reconstructed during rendering using the proxy geometry.

In another embodiment, a multi-planar reformatting or reconstruction is rendered. One or more voxel values are used for the multi-planar reformatting. Two or more planes through the volume are determined. One or more of these planes are different from the scan planes. The planes define voxel locations for reconstruction instead of using the three-dimensional grid. Alternatively, the planes define locations for which data is interpolated from the three-dimensional grid. Using the reconstruction, one or more values for locations along the planes are determined. The values are used to generate a two-dimensional image of the plane in the volume.

Figure 7:
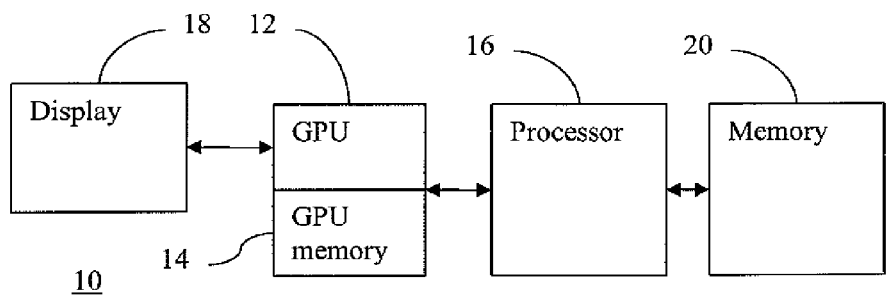
FIG. 7 is a block diagram of one embodiment of a system for three-dimensional reconstruction from an irregular ultrasound sampling grid.

FIG. 7 shows a system 10 for three-dimensional reconstruction from an irregular ultrasound sampling grid. The system 10 includes a graphics processing unit (GPU) 12, a GPU memory 14, a processor 16, a display 18, and a memory 20. Additional, different, or fewer components may be provided. For example, a hard drive, removable media, or other memory component is provided in addition to or as a replacement for the memories 14 or 20 of the system 10. As another example, a user input, display, network, or network connection are provided, such as for networking with a medical imaging network or data archival system. In another example, the memory 18 and the GPU memory 14 are combined.

The system 10 is part of a medical imaging system, such as a diagnostic or therapy ultrasound system. Alternatively, the system 10 is part of an archival and/or image processing system, such as associated with a medical records database workstation. In other embodiments, the system 10 is a personal computer, such as desktop or laptop.

A data source provides ultrasound data to the processor 16, memory 20, GPU 12 and/or GPU memory 14. The data source is an ultrasound beamformer, ultrasound detector, ultrasound scan converter, network, database, storage device, computer, or other device operable to acquire and/or store a set of data representing a volume. For example, the data source simultaneously or sequentially provides tens, hundreds or even thousands of two dimensional images and associated spatial relationship information. Images may include data for generating an image even if not in an imaging format or data in an imaging format previously or not yet used to display an image. In one embodiment, the data source provides the images to the memory 20.

The memory 20 is a system memory, cache memory, random access memory, CPU memory, buffer, combinations thereof or other now known or later developed memory. The memory 20 is operable to sequentially store different subsets or an entire collection of the data representing the volume. For example, the memory 20 stores an array of two dimensional images as they are acquired and used, stores all images to be used, or stores an on-going collection of the images.

The two dimensional images represent parallel or non-parallel slices or planes through a patient or structure. The planes are spaced apart in one dimension, such as being separate at a plurality of depth or azimuth locations. The planes may intersect in or outside of the volume of interest.

The images have a same or different resolution with the same or varying spacing between each immediately adjacent pair of images. For each plane, ultrasound data represents a plurality of sample locations. The sample locations for the planes in combination are in an irregular ultrasound sample grid. The irregular grid has sample locations in one plane offset from the sample locations of another plane by a fractional distance. The grid is skewed along at least one dimension, such as being regularly spaced in azimuth and range but skewed with an azimuth offset along the elevation dimension. For example, the planes and corresponding sample locations are acquired by scanning from different apertures along a linear array twisted about a longitudinal axis of the linear array. The sample locations of one plane are offset from the sample locations of another plane by the fractional distance. Alternatively, the grid is irregular within one or more planes.

The data contents of each image are contiguous within the memory 20 to ensure good cache coherency, but one or more images with data in non-contiguous addresses may be used. The images may be stored in different memories (e.g., the memory 14 and the memory 20) and the images may lack uniform scaling and/or inter-image distance.

The processor 16 is a general processor, digital signal processor, application specific integrated circuit, field programmable gate array, graphics processor unit, central processing unit, analog circuit, digital circuit, combinations thereof, multiple processors, network or other now known or later developed processor. In one embodiment, the processor 16 and the memory 14 are part of a graphics processing unit, such as a graphics card operable pursuant to OpenGL, DirectX, or other graphical data rendering languages. In another embodiment, the processor 16 is a control or general processor for interacting with the GPU 12.

The processor 16 controls loading data from the memory 20 into the graphics processing unit 12. The processor 16 may be configured to perform interpolation and/or rendering functions. In one embodiment, the processor 16 computes information used for reconstructing a three-dimensional grid. The information includes values for parameters based on known relationships for a given sequence of volumes. Any parameters that are fixed or used without change for reconstructing the three-dimensional grid and/or rendering images from the grid are calculated or loaded by the processor 16. Such parameters include range, elevation, and azimuth limits; sample spacing in range, azimuth, and elevation; and Cartesian sampling grid spacing. For parameters that have values which may change or vary through a sequence of volumes, the GPU 12 calculates or loads the parameters. Other distributions of processing may be used.

The graphics processing unit (GPU) 12 is a graphics accelerator chip, processor, application specific integrated circuit, analog circuit, digital circuit, accelerator card, or combinations thereof. In one embodiment, the GPU 12 is a personal computer graphics accelerator card or components, such as manufactured by nVidia (e.g. Quadro FX 4500 or others), ATI (e.g. Radeon 9700 or others), or Matrox (e.g. Parhelia or others). A custom GPU may be used. The GPU 12 provides hardware devices for accelerating volume rendering processes, such as using application programming interfaces (API) for reconstructing a three-dimensional grid and/or rendering an image from the reconstructed grid. Example APIs include OpenGL and DirectX, but other APIs may be used independent of or with the GPU 12.

The GPU 12 is operable for volume rendering based on the API or an application controlling the API. For example, the GPU 12 is operable to texture map with alpha blending, minimum projection, maximum projection, surface rendering, or other volume rendering of the data. The GPU 12 also performs reconstruction to a Cartesian or other grid, such as bilinear and/or linear interpolation.

The GPU 12 is conceptually or physically divided into a plurality of different processors. For example, the GPU 12 includes fragment and vertex shaders as well as other processors in the rendering pipeline. Different processors have different functions. The calculations for interpolation weights, finding planes, determining a target sample, identifying sample locations and samples, bilinear interpolation, linear interpolation, or other functions discussed herein are preformed by the same or different processors of the GPU 12 and/or the processor 16.

In one embodiment, a fragment processor of the GPU 12 is configured to perform the bilinear and/or linear interpolation. The locations of four samples are determined for each plane. The locations are bilinearly interpolated in each plane from the ultrasound data. The four samples are closest to and surrounding the locations in the planes projected from the target or voxel location. The samples for positions closest to each point of the Cartesian grid are bilinearly interpolated.

The fragment processor may be configured to linearly interpolate to a Cartesian grid from the bilinearly interpolated samples of different planes. The bilinear interpolation results from adjacent planes are linearly interpolated along the elevation dimension. The linear interpolation completes interpolation from the acquisition data to the Cartesian or other global grid. Data is interpolated from the irregular grid to the regularly spaced three-dimensional grid.

The fragment processor is configured to perform the bilinear interpolation and perform the linear interpolation for other locations between two given planes and/or for other locations between other pairs of planes. The entire or a subset of the acquired data is reconstructed to the Cartesian or other grid. The Cartesian or other grid is populated with voxel values. Voxel values are determined for one or more planes for MPR or for a volume for volume rendering.

The GPU 12, using the fragment processor and/or other processors, renders an image from the voxel data representing grid points of the Cartesian or other grid. Any now known or later developed rendering may be used.

The GPU 12 and/or the GPU memory 14 are included within the system 10 as part of a single system component, such as a medical diagnostic or therapy imaging system. In alternative embodiments, the GPU 12 and GPU memory 14 are provided separate from a data acquisition system, such as provided in a workstation or personal computer. The acquired data is transferred wirelessly, over a computer network, or through a transferable storage medium to the GPU 12.

The GPU memory 14 is a video random access memory, a random access memory, or other memory device for storing data or video information. In one embodiment, the GPU memory 14 is a video random access memory of the GPU 12. A driver for the GPU 12 or a memory driver controls storage of data by the GPU memory 14. The GPU memory 14 is responsive to the driver to store, transfer, and retrieve data. The GPU memory 14 is operable to store the interpolation weights, ultrasound samples for interpolation, and/or interpolated results.

In one example GPU implementation, the volume data is stored in the GPU memory 14. The ultrasound data of all the planes, a subset of the planes, or the selected planes for a given interpolation are stored. The resulting voxel data may be stored. The voxel values can further be used for classification and shading.

The GPU memory 14 and/or the memory 20 are non-transitory computer readable storage medium having stored therein data representing instructions executable by a programmed processor. The instructions, by being loaded into or available to the processors of the GPU 12 and/or the processor 16, configure the processor(s). The processor 16 or GPU 12 operates pursuant to instructions stored in the memory 14, memory 20, or another memory. The processor 16 or GPU 12 is programmed for hardware accelerated three-dimensional reconstruction. The memory is a non-transitory computer readable storage media. The instructions for implementing the processes, methods and/or techniques discussed herein are provided on the computer-readable storage media or memories, such as a cache, buffer, RAM, removable media, hard drive or other computer readable storage media. Non-transitory computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing, and the like. In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU or system.

The display 18 is a CRT, LCD, projector, plasma, or other now known or later developed display device. The display 18 generates an image or sequence of images during or after the data is rendered. The image is a three dimensional representation, such as a two dimensional image rendered from a user or processor selected viewing direction. Alternatively, the image is one or more two-dimensional images representing planes in the volume. The display 18 is part of a local system 10 or is remote, such as a networked display.

z is used above for the global coordinates. In alternative embodiments, the range may be used instead of z.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A method for three-dimensional reconstruction from an irregular ultrasound sampling grid, the method comprising:

acquiring ultrasound data representing sample locations in first and second azimuth-range planes associated with scanning from different apertures along a linear array twisted about a longitudinal axis of the linear array such that the sample locations of the first plane are offset in azimuth from the sample locations of the second plane by a non-integer amount of scan line spacing;

determining a grid voxel of a three-dimensional grid, the grid voxel between the first and second planes;

bilinearly interpolating, by a graphics processing unit, a first sample in the first plane from data of the sample locations of the first plane;

bilinearly interpolating, by the graphic processing unit, a second sample in the second plane from data of the sample locations of the second plane;

linearly interpolating a voxel value for the grid voxel from the first and second samples; and rendering an image from the three-dimensional grid, the image being a function of the voxel value;

wherein the bilinearly interpolating of the first sample comprises interpolating the first sample to a first position on the first plane, the first position in the first plane being closest to the grid voxel, relative distances from the sample locations of the first plane to the first position weighting the interpolating of the first sample; and wherein the bilinearly interpolating of the second sample comprises interpolating the second sample to a second position on the second plane, the second position in the second plane being closest to the grid voxel, relative distances from the sample locations of the second plane to the second position weighting the interpolating of the second sample.

2. The method of claim 1 wherein the linear array comprises a helix twisted array in a catheter, wherein acquiring the ultrasound data comprises acquiring the ultrasound data in the irregular ultrasound sampling grid, and wherein rendering the image comprises rendering a two-dimensional representation of a volume from data, including the voxel value, representing the three-dimensional grid, the three-dimensional grid comprising a isotropic volume.

3. The method of claim 1 wherein rendering comprises rendering a multi-planar reconstruction.

4. The method of claim 1 wherein the linearly interpolating and the rendering are performed by the graphics processing unit.

5. The method of claim 1 wherein acquiring comprises scanning a patient, and wherein rendering comprises rendering the image at least ten times a second in real time with the acquiring.

6. The method of claim 1 wherein the bilinearly interpolating acts and the linearly interpolating act are repeated for a plurality of additional grid voxels between the first and second planes and are repeated for other planes, the three-dimensional grid being regularly spaced along three dimensions.

7. The method of claim 1 wherein the bilinearly interpolating acts each comprise interpolating data from four nearest sample locations.

8. The method of claim 1 wherein the bilinearly interpolating acts comprise retrieving memory locations for the data.

* * * * *